United States Patent [19]

Morganti

[11] 4,422,375

[45] Dec. 27, 1983

[54] ROLLER PRESS

[76] Inventor: Luigi Morganti, 3224 Harrison Ave., Reading, Pa. 19605

[21] Appl. No.: 375,353

[22] Filed: May 6, 1982

[51] Int. Cl.³ .............................................. B30B 3/02
[52] U.S. Cl. .................................. 100/210; 100/100; 47/1.1; 404/103; 404/119
[58] Field of Search .................. 100/155 R, 156, 100, 100/210; 404/103, 119; 47/1 A, 1.1; 172/23, 26, 40, 383, 393, 199

[56] References Cited

U.S. PATENT DOCUMENTS

| | | | |
|---|---|---|---|
| 893,168 | 7/1908 | Hewitt | 404/119 |
| 2,372,163 | 3/1945 | Whitteman | 404/119 |
| 3,450,012 | 6/1969 | Beierlein et al. | 404/103 |
| 3,704,752 | 12/1972 | Piacentino | 47/1.1 X |
| 3,797,953 | 3/1974 | Lindskog | 404/103 |
| 4,057,916 | 11/1977 | Roemer | 172/393 X |
| 4,115,976 | 9/1978 | Rohrer | 404/119 X |
| 4,170,432 | 10/1979 | Pia | 47/1 A X |
| 4,280,800 | 7/1981 | Bunn | 404/103 X |

*Primary Examiner*—Peter Feldman
*Attorney, Agent, or Firm*—William J. Ruano

[57] ABSTRACT

A roller press assembly for compacting mushroom beds and the like. A carriage-like structure having a pair of rollers suspends a vertically adjustable smoothing plate for compacting and smoothing the surface of the bed. The structure may be guided manually by handles or by side rails. Such side rails may be provided on each of a plurality of vertically stacked beds to form a bunk bed structure to enable selective traversing by the roller press.

2 Claims, 8 Drawing Figures

U.S. Patent    Dec. 27, 1983    Sheet 1 of 3    4,422,375
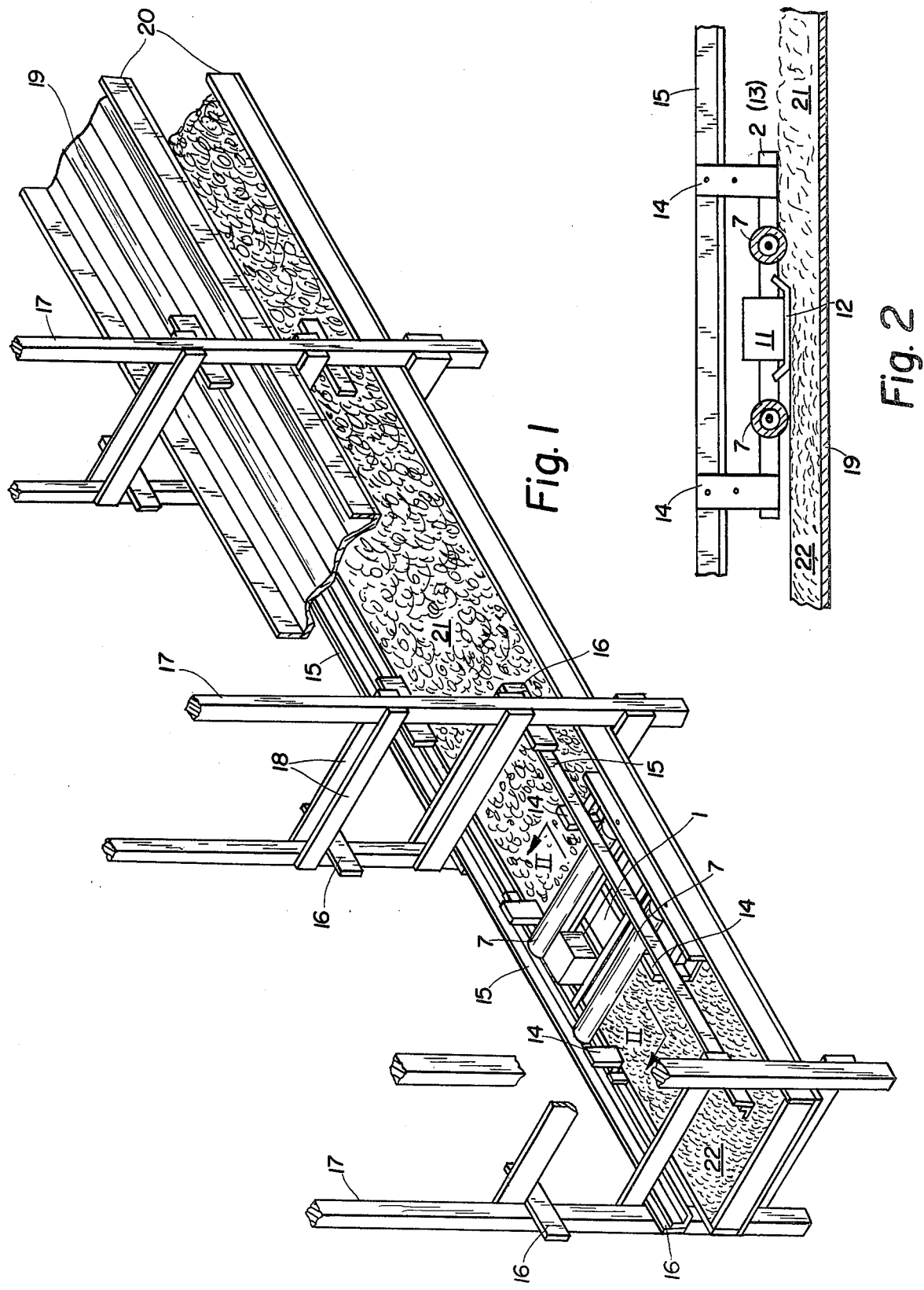

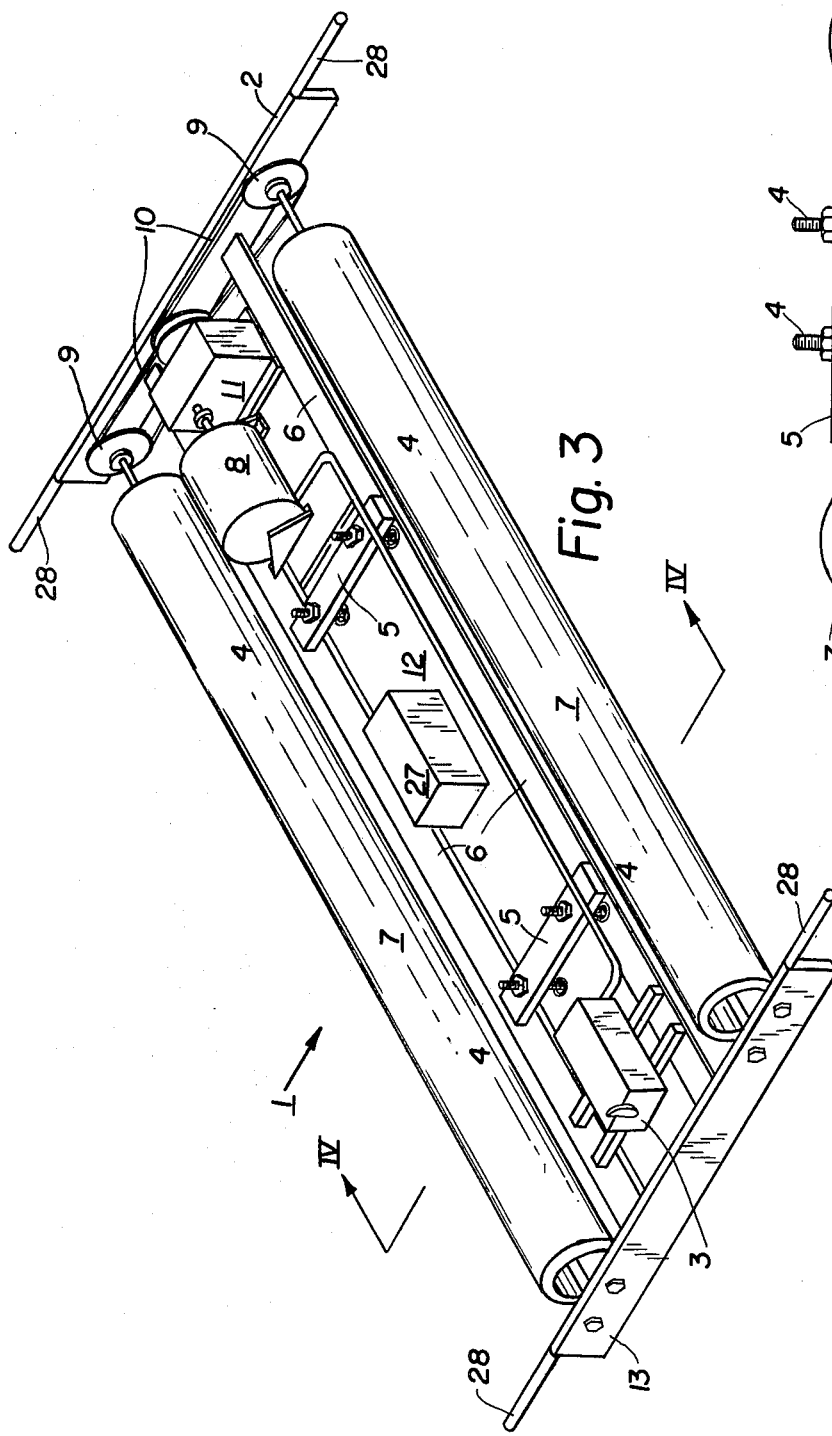
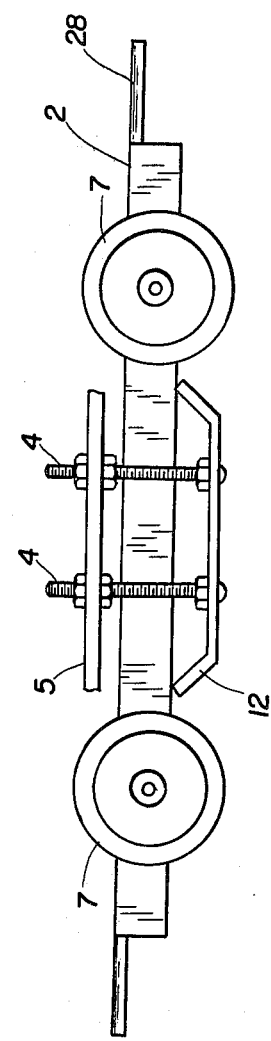

ROLLER PRESS

This invention relates to a roller press assembly for compacting a mushroom bed or the like.

In the past, mushroom beds have been compacted generally by hand. This has been laborious and time consuming as well as inefficient and incapable of obtaining the desired uniform density and proper levelling of the top surface of the bed.

An object of this invention is to provide a novel roller press and assembly for overcoming the above-named disadvantages.

A more specific object of the invention is to provide a roller press assembly for enabling sequential rolling and pressing of mushroom beds mounted in vertically stacked relationship.

Other objects and advantages of the invention will become more apparent from the following description taken with the accompanying drawing wherein:

FIG. 1 is a top perspective view of a roller press assembly for pressing several vertically stacked layers of mushroom beds;

FIG. 2 is a cross-sectional view taken along the line II—II of FIG. 1;

FIG. 3 is an enlarged fragmentary view of the roller press shown in FIG. 1;

FIG. 4 is a side view of the roller press shown in FIG. 3 taken along line IV—IV;

Figure 5:
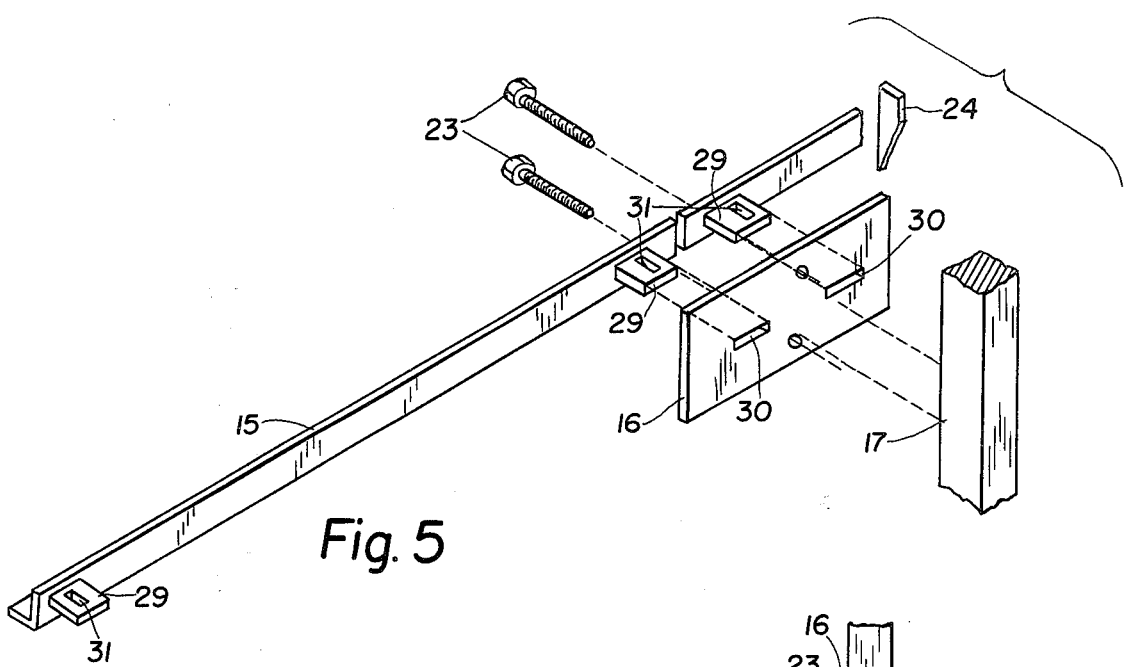
FIG. 5 is an exposed view of the assembly shown in FIG. 6.

Referring more particularly to FIG. 1, the roller press generally denoted by numeral 1 is designed to compact a compost of hay, stray, manure and nutrient, commonly referred to as mushroom soil 21, in its bed 19, prior to the deposition of the mushroom spores. Compaction of the loose mushroom soil 21 by use of the roller press 1 provides a dense, void free flat mushroom bed in which the root system of the mushroom spores can flourish. Use of the roller press for compaction replaces a hand procedure known as paddling, reducing the time required to perform this operation as well as providing a more uniform bed density and flat surface. The addition of weight or vibrator 27 optional to the roller press controls the final density of the mushroom bed.

The roller press can be used with FIG. 1 or without FIG. 3 guide rails 15 or side-board wheels 32. This feature was incorporated into the design to make the machine versatile. The use of guide rails 15 or sideboard wheels 32 requires the installation of semi-permanent equipment which will not be available on all mushroom beds.

As shown in FIG. 3, the parts of the roller press 1 are frame (idlerside) 13, frame (driver side) 2, frame (center) 6, reversing switch 3, leveling bolts 4 smoothing plate support 5, rollers 7, drive motor 8, drive sprockets 9, drive chain 10, and reducing gear 11. The frame (idlerside) 13, the frame (driver side) 12 and the frame (center) 6 make up the basic structure and supports all of the other components. The two rollers 7 are mounted in bearing brackets (not shown) located on the frame (idlerside) 13 and frame (driver side) 2. The bearing brackets are adjustable to permit adjustment of the drive chain 10 tension.

A drive sprocket 9 is attached to each of the rollers 7 on the driver side of the roller press 1 and is used to impart rotation to each of the roller 7 through the drive chain 10 from the reducing gear 11. The motive power for the roller press 1 is by an electric drive motor 8. A reducing gear 11 is used to reduce the synchronous speed of the electric motor down to a suitable speed for the rollers 7 which provide the horizontal movement of the roller press 1. The horizontal movement is dependent on the rotation of the rollers 7 and the friction developed between the rollers 7 and the compacted mushroom soil 22, (FIG. 1) and the loose mushroom soil 21. The direction or movement is controlled by a reversing switch 3 connected to the electric drive motor 8. The smoothing plate 12 is attached to the frame (center) 6, through the smoothing plate support 5 and leveling bolts 4 are also used to adjust the smoothing plate 12 for the leveling bolts 4.

The height of the smoothing plate 12 determines the friction between the rollers 7 and the compacted mushroom soil 22 and the loose mushroom soil 21. The correct height permits the roller press 1 to move in a horizontal direction without the rollers 7 digging in. A vibrator 27 or additional weight may be added to the roller press 1 to increase the compaction of the soil.

The roller press is guided down the length of a mushroom bed by two operators, one on each side, using the hand guides 28 affixed to the frame (idler side) 13 and the frame (driver side) 2 by double designation.

The purpose of the optional guide rails 15, shown in FIG. 1 are to guide the roller press 1 down the length of the mushroom bed without going askew. In addition, the guide rails 15 maintains the roller press 1 at the same height above the mushroom bed providing a level surface of uniform density. The guide rails 15 are attached to the vertical uprights 17 in a manner that permits their removal or relocation providing unimpeded access to each level of the mushroom beds. The unimpeded access is required to initially fill the beds with fresh mushroom soil and to remove the expended soil at the end of the growing cycle.

Figure 6:
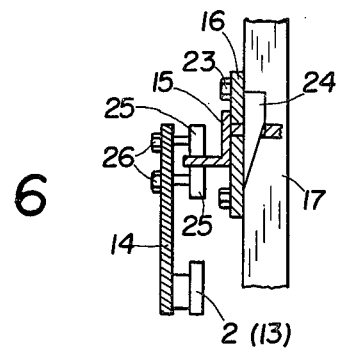
FIG. 6 is an assembly of a portion of a structure shown in FIG. 1.

Guide rail mounts 16 are attached to the uprights 17 at each bed level and are permanently located at a level height above the bottom planking 19. The horizontal spacing of the guide rail mounts 16 is such that any guide rail 15 can be utilized between any two guide rail mounts 16, as shown in FIGS. 5 and 6. The guide rail mounts 15 are are held in place by inserting the two tongues 29 on the guide rail 15 and into the tongue slots 30 located in the guide rail mounts 16. The guide rails 15 are then held in place by inserting the guide rail locking wedges 24 into the keyhole slot 31 located in the tongues 29 of the guide rail 15.

Adjustable frame supports 14 are attached to the frame (idler side) 13 and frame (driver side) 2 at each end by bolting and supports the roller press 1 at each of the four corners. Mounted on each of the four adjustable frame supports are two guide wheels 25 fastened by wheel bolts 26. The guide wheels 25 will ride on the top and bottom side of the guide rail 15 providing easy movement of the roller press 1 while maintaining its axial and veroical positions.

Figure 7:
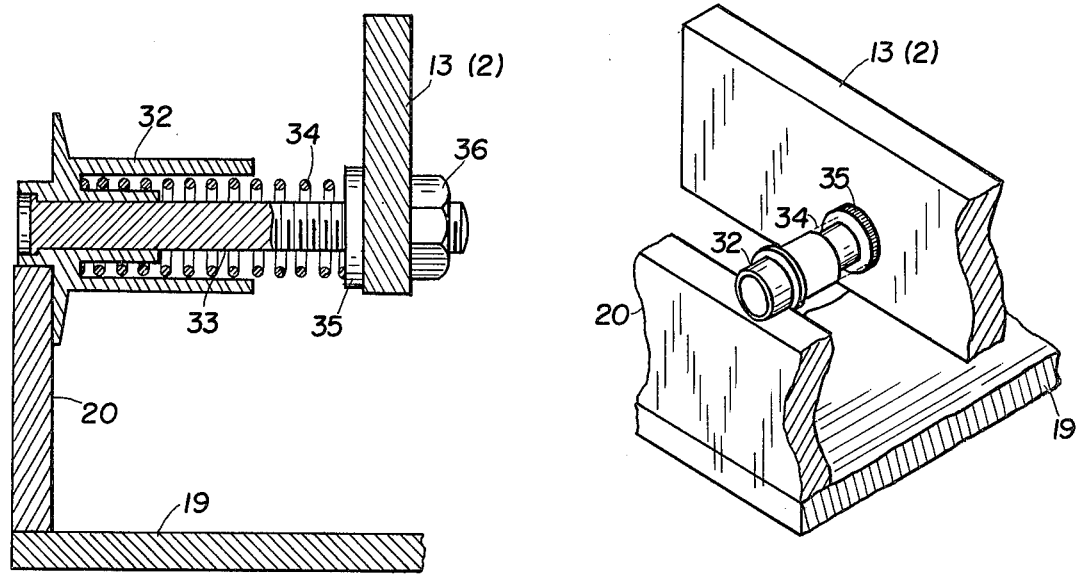
FIG. 7 is an enlarged side view of a fragmentary portion of the assembly shown in FIG. 1.
Figure 8:
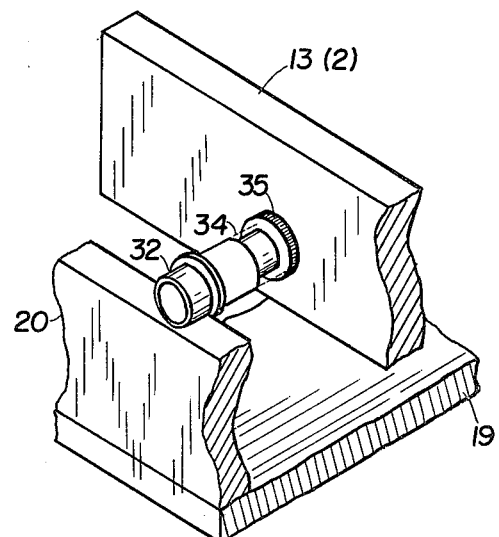
FIG. 8 is a top respective view of assembly shown in FIG. 7.

The purpose of the optional sideboard wheels, 32 as shown in FIGS. 7 and 8, to guide the roller press 1 down the length of the mushroom bed without going askew. The advantage of the sideboard wheel 32 arrangement is that no additional hardware has to be added to the mushroom bed, as in the guide rail arrangement.

The sideboard wheels 32 are attached to the four corners of the roller press 1 on the idler side frame 13 and the driverside frame 2. The sideboard wheels are mounted on the retaining axle bolt 33 which in turn is held tight against the frames by the jam nut 35 and the lock nut 36. The spring 34 maintains outward pressure on the sideboard wheels 32 which forces them to follow the sideboards 20.

Thus it will be seen that I have provided an efficient and versatile roller press and assembly to enable smoothing and compressing of mushroom beds and the like, either by guiding the roller press by hand or by stationary guide rails which can traverse either a single mushroom bed or a tier of beds, enabling accurate levels or heights of the bed and uniform density, as well as enabling mass production of mushrooms, or the like, in a minimum of space.

While I have illustrated and described a single specific embodiment of my invention, it will be understood that this is by way of illustration only and that various changes and modifications may be contemplated in my invention which are within the scope of the following claims.

I claim:

1. A roller press assembly for compacting mushroom beds, comprising a roller press including a pair of parallel frames, extending horizontally, a pair of rollers mounted on said frames at right angles to form a carriage, a central frame located between said rollers and supported by said parallel frames, a vertically adjustable smoothing plate mounted on said central frame substantially coextensive with said rollers and depending from said central frame, drive motor means including speed reducing means controlled by a reversing switch and mounted on said central frame for driving said rollers, successively, in one direction and in an opposite direction at reduced speed, a bunk bed comprising a plurality of horizontally extending guide rails mounted on vertical posts in vertically spaced relationship, a mushroom bed mounted underneath each of said guide rails so as to enable said roller press to be successively moved to different tiers of said bunk bed and guided by said guide rails while traversing and compacting the associated mushroom bed.

2. A roller press assembly as recited in claim 6 wherein said rollers are in the form of sideboard wheels having radial flanges engaging the inner surfaces of said guide rails, and helical spring means surrounding the axles of said wheels and interposed between said radial flanges and said parallel frames to yieldably guide said carriage along said guide rails.

* * * * *